March 28, 1939. W. S. F. BROWN ET AL 2,152,529
ELECTRIC CLOCK
Filed Feb. 5, 1936 7 Sheets-Sheet 1

Reversible synchronous motor

INVENTORS
W. S. F. Brown.
A. J. Tennison.
By Lacey & Lacey,
Attys.

March 28, 1939.  W. S. F. BROWN ET AL  2,152,529
ELECTRIC CLOCK
Filed Feb. 5, 1936  7 Sheets-Sheet 2

Reversible synchronous motor

INVENTORS
W. S. F. Brown.
A. J. Tennison.
By Lacey & Lacey,
Attys

INVENTORS
W. S. F. Brown.
A. J. Tennison.
By Lacey & Lacey,
Attys

March 28, 1939.  W. S. F. BROWN ET AL  2,152,529
ELECTRIC CLOCK
Filed Feb. 5, 1936  7 Sheets-Sheet 4
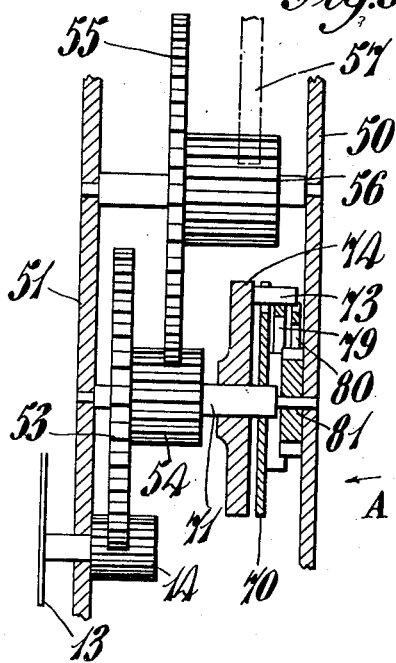
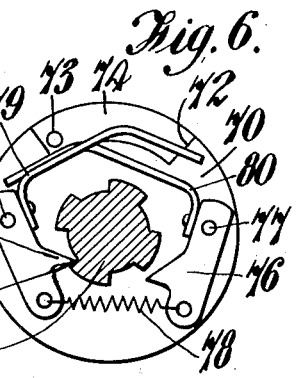
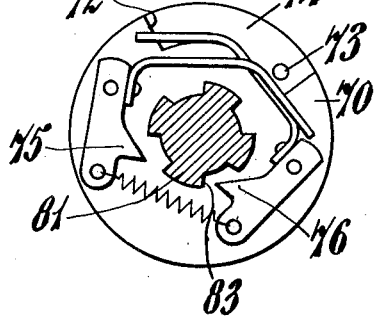
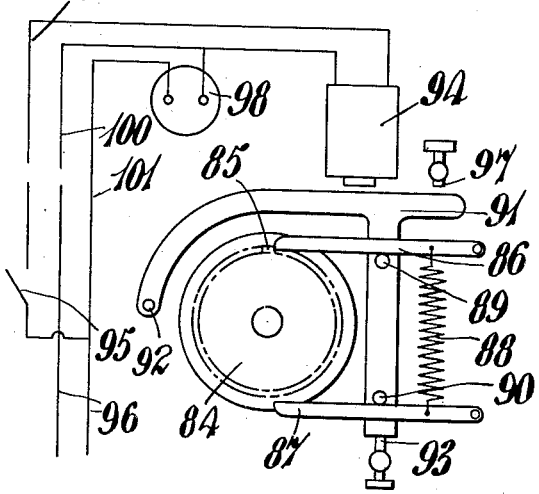
INVENTORS
W. S. F. Brown.
A. J. Tennison.
By Lacey & Lacey
Attys

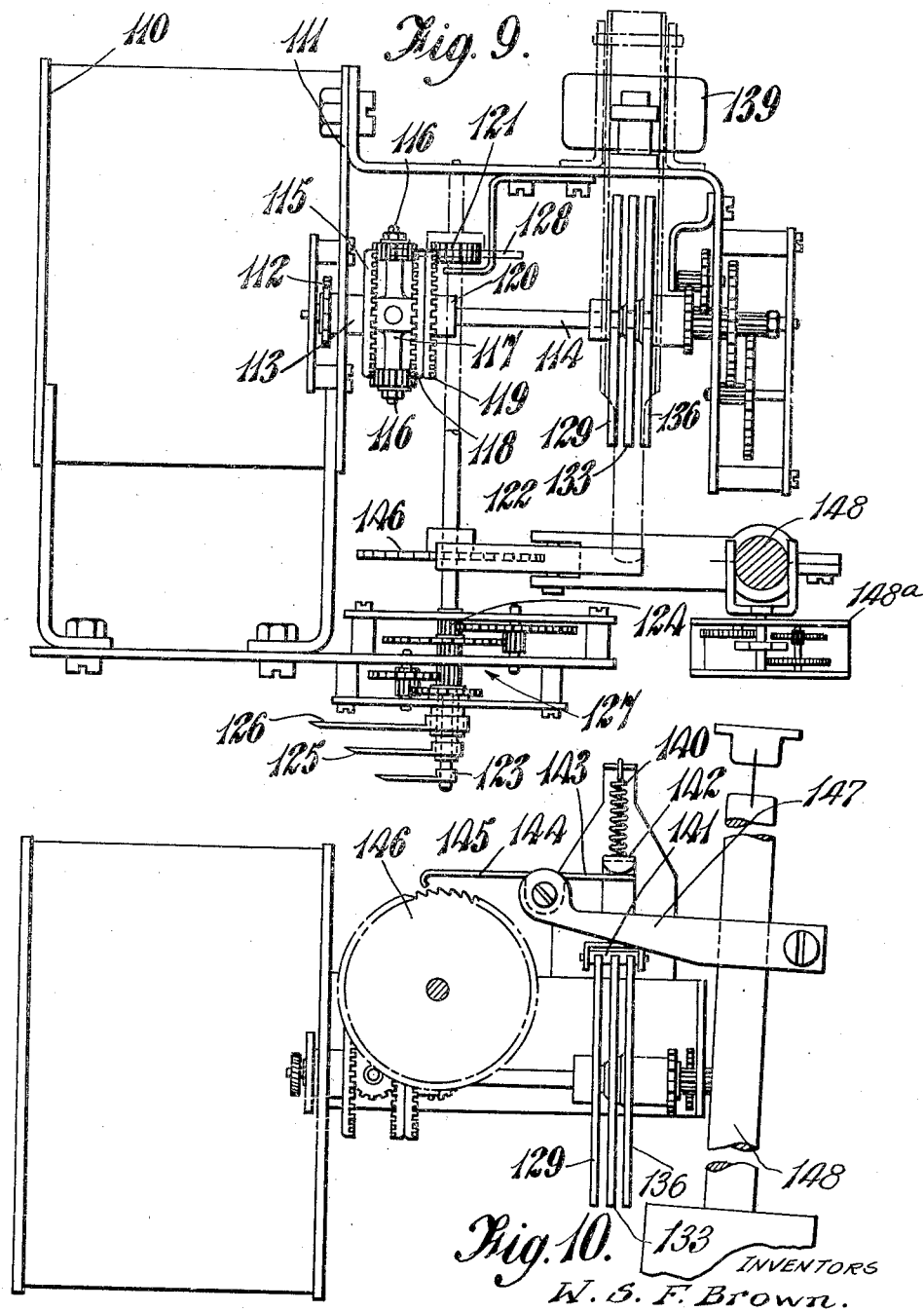

INVENTORS
W. S. F. Brown.
A. J. Tennison.
By Lacey & Lacey,
Attys

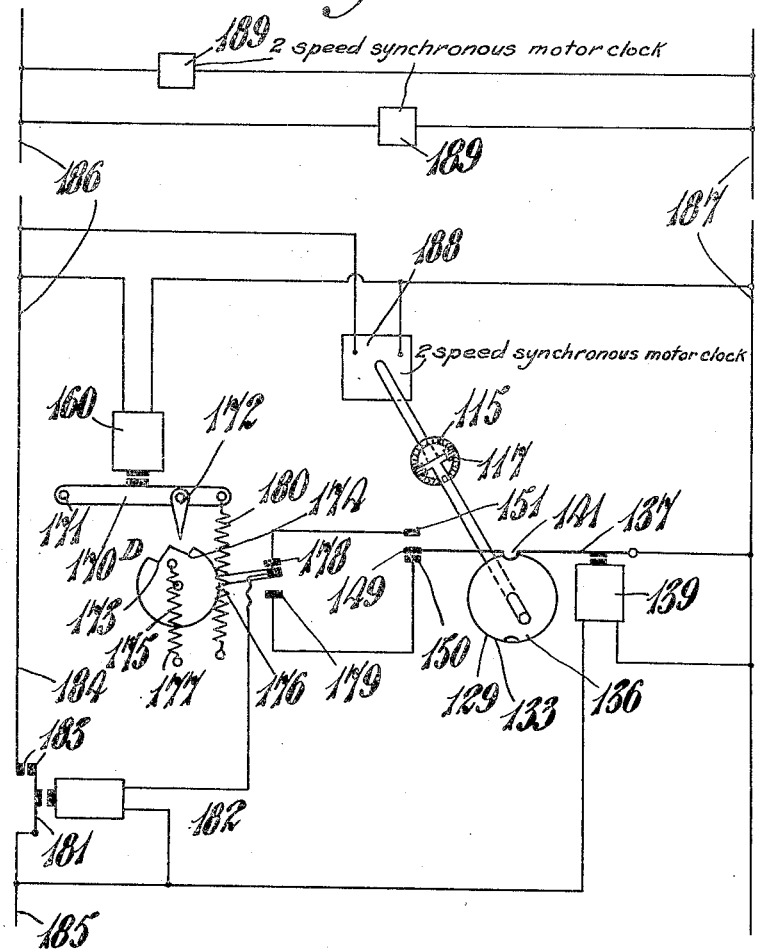

Patented Mar. 28, 1939

2,152,529

UNITED STATES PATENT OFFICE 2,152,529

ELECTRIC CLOCK

Westgarth Stanhope Forster Brown, Cranbrook, and Alfred John Tennison, Croydon, England Application February 5, 1936, Serial No. 62,504
In Great Britain February 5, 1935

9 Claims. (Cl. 58—26)

This invention relates to electric clock systems of the kind employing synchronous motors which are fed from a source of alternating current, the frequency of said current being suitably governed so that clock mechanisms driven by the synchronous motors act as satisfactory time-indicators.

The main disadvantage with synchronous motor clocks is that in the event of power failure of the mains in the event that the system as a whole requires resetting, such, for instance, at the beginning and end of "summertime" it is necessary to reset each clock individually. It has previously been proposed to overcome this disadvantage, by providing in each secondary clock of a synchronous motor system, and also in a master clock, two synchronous motors, the one being adapted to drive the indicating means at the normal speed and the other, fed through a different circuit to advance the indicating means through gearing at a speed many times greater than normal when resetting is required, the master unit being arranged so that in the event of failure in the electricity supply, a spring-driven clock continues working, thus integrating the time lost due to the current failure so that when the supply is resumed the secondary clocks are set forward by feeding current to the "correction" motor of each pair until such time as the whole system is once more showing the same time as the spring-driven clock. The normal rate of advance is then obtained by reverting to the usual supply circuit.

The present invention has for its primary object to provide an improved synchronous motor clock system which is comparatively cheap to manufacture and which may if desired readily be arranged in conjunction with automatic resetting means whereby the system is corrected without attention, should a failure occur in the electricity supply. As a further object the invention provides an improved synchronous motor clock system and an arrangement for a control clock suitable for use therewith.

In a synchronous motor clock having means whereby the hands or equivalent are arranged to be rotated electrically at a speed different from normal for resetting purposes, according to the present invention a single electric motor is coupled with the hands or equivalent through variable speed gearing, the ratio of said gearing being varied from normal to produce the additional speed of the hands or equivalent required for resetting. The variable speed gearing can be actuated mechanically or electro-magnetically when resetting is required but as an alternative, the synchronous motor clock may be arranged to be sensitive to fluctuations or other changes in the supply current, thus providing means whereby all the clocks in a system can be reset when required without the necessity of providing more than two feed conductors, or of isolating the clock system from other electrical devices, such as lamps, domestic appliances and similar apparatus, the usual electricity distribution wiring of a building being used for the clocks. Thus, in the preferred method of operation, a master clock capable of taking account of any failures in the supply current can be arranged to control a main contactor whereby intentional breaks of short duration may be produced when required throughout the electric circuit for controlling the setting of the variable speed gears of the various clocks. For this purpose use is made of electro-magnetic devices which will hereinafter be referred to as "alternate break relays" in which an armature or equivalent actuated electro-magnetically is arranged to actuate a member having a reciprocatory or oscillatory movement, said member being actuated by each de-energisation of the solenoid so that the first break in the supply moves the actuated member in one direction, the second returns said member to its original position, the third break acts the same as the first, and so on.

The invention further provides an improved synchronous motor clock system in which a control clock and a number of so-called secondary clocks fitted with means for changing the velocity ratio are connected with a two-wire electricity supply system, and are arranged to be controlled for resetting purposes by means of interruptions in the supply current.

The invention is illustrated in the accompanying drawings which are diagrammatic only, and in which Figure 1 is a sectional side elevation of a synchronous motor clock having a normal and an increased rate of advance effected by means of planetary gearing;

Figure 5 is a fragmentary section to an enlarged scale taken on the line 5—5 of Figure 3;

Figures 6 and 7 are both rear elevations taken in the direction of the arrow A of Figure 5 and illustrating the action of the direction-controlling means;

Figure 8 shows a modified method of controlling the rotational direction of the synchronous motor by means of an electrical control circuit;

Figure 9 is a fragmentary plan of one construction of control or master clock;

Figure 10 is a front elevation corresponding to Figure 9;

Figure 13 shows the electrical components of the control clock and the connections of the system generally.

Figure 1:
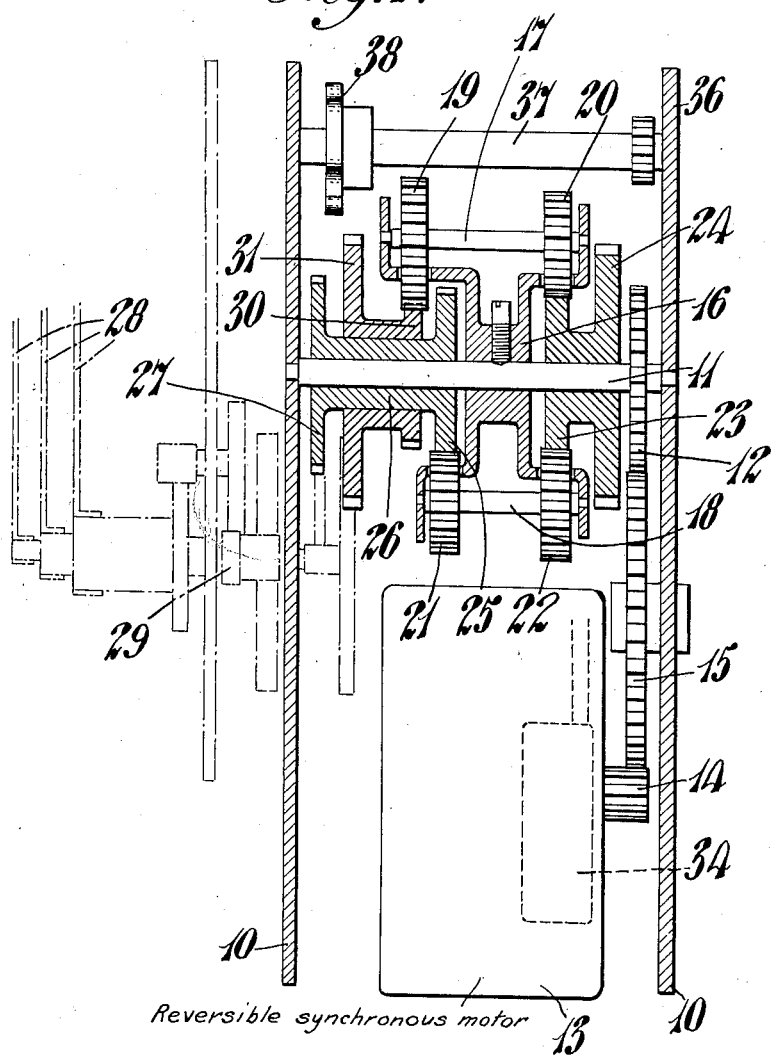
Figure 2:
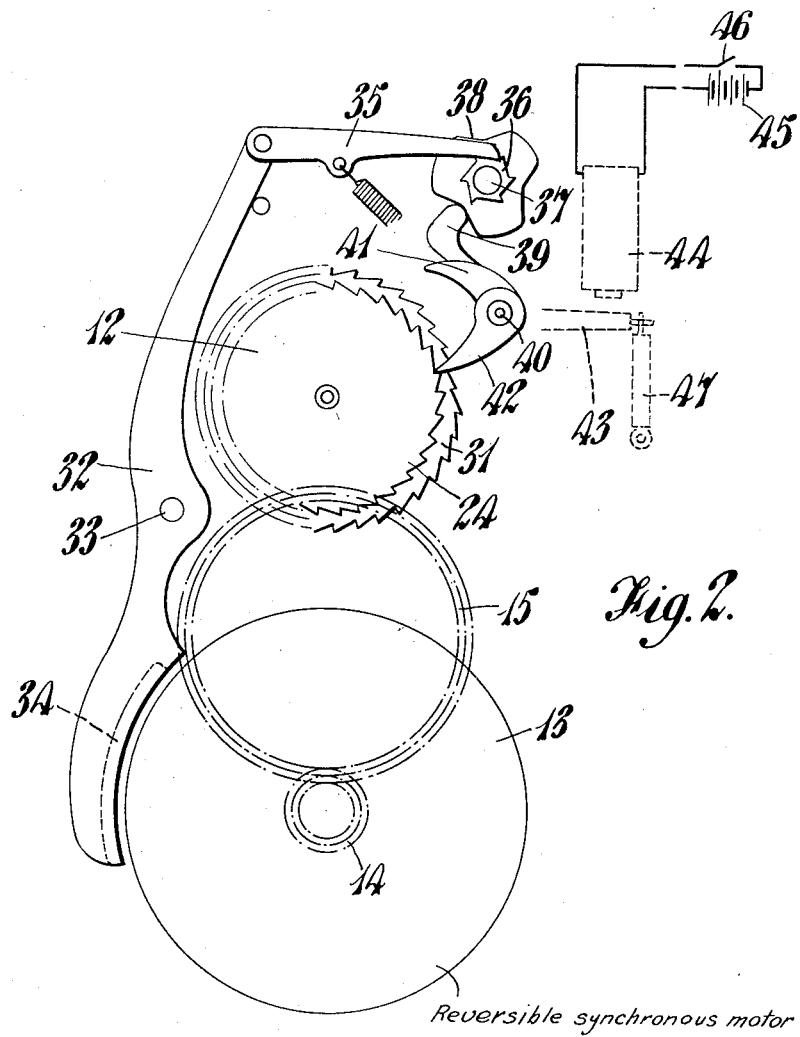
Figure 2 shows in rear elevation the means used for controlling the planetary gearing.

In the synchronous motor clock unit shown in Figures 1 and 2 which is suitable for use as a secondary clock or for incorporation in a control clock, a pair of stationary plates 10 are arranged to support a main spindle 11 having a gear wheel 12 which is driven by means of a synchronous motor 13 having a pinion 14, an idler wheel 15 being arranged to complete the drive. A planet carrier 16 is fixed upon the main spindle 11 and carries two planetary spindles indicated at 17 and 18 respectively, these being fitted with gear wheels 19, 20, 21 and 22 as shown. The gear wheels 20 and 22 are operatively connected by a gear wheel 23 which rotates freely upon the main spindle 11 and is formed in one with a ratchet or detent wheel 24. On the other hand the wheel 21 engages a gear 25 fast upon a sleeve 26 which is also freely rotatable upon the spindle 11, and which carries a gear wheel 27 transmitting movement to the usual hands 28 or equivalent indicating means through gearing of the usual form, indicated generally at 29. The gear wheel 19 meshes with a gear wheel 30 which is formed in one with a ratchet wheel 31, both being freely rotatable as a unit upon the outside of the sleeve 26.

The speed or rate at which the hands 28 are advanced depends upon which of the ratchet or detent wheels 24 or 31 is held stationary, and the means for effecting this is shown more particularly in Figure 2. A rocking lever 32 pivoted at 33 and carrying an armature 34 adapted to be attracted inwards when the synchronous motor 13 is energized, carries at its upper end a pawl 35 cooperating with a ratchet wheel 36 carried by a transverse shaft 37. The ratchet wheel thus drives a cam 38, and this in turn actuates a follower 39 pivoted at 40 and arranged to control a pair of detents 41 and 42, the first of these cooperating with the wheel 31 and the second with the wheel 24. Thus the ratchet wheels 24 and 31 are alternately rendered stationary, the pawls 41 and 42 being automatically changed over each time the current to the synchronous motor 13 is interrupted and the arm 32 released.

Reverting to Figure 1, it will be seen that when the wheel 24 is held stationary, as during the normal operation of the clock, rotation of the planet carrier 16 by means of the main spindle 11 causes the wheel 22 to be driven, and this in turn rotates the gear wheel 21. As the numbers of teeth on the wheels 23 and 25 are slightly different a slow rotation is thereby imparted to the wheel 25, and this in consequence drives the hands 28 through the wheel 27 and train 29. Incidentally the wheel 30 is, of course, driven by means of the wheels 19 and 20, but as the ratchet wheel 31 is free, such rotation does not affect the hands 28.

When on account of a current-failure or other cause the clock requires resetting, the ratchet wheel 24 is freed and the wheel 31 is held by the pawl 41. In this condition, therefore, the planet wheel 19 rotates around the wheel 30 thus driving the wheel 20, and also the planet wheel 22 on account of the interposed gear wheel 23. Rotation of the spindle 18 is thence transferred by the planet wheel 21 to the gear wheel at 25, thus causing the hands 28 to be advanced at a comparatively high rate, say sixteen times the normal, by rotation of the synchronous motor 13 at its usual speed.

The synchronous motor clock as so far described is intended to be used in accordance with the improved system of the invention, in which the velocity ratio between the pinion 14 or rotor of the synchronous motor 13 and the hands 28 or equivalent indicating means is changed over from its normal value to a lower value every alternate time the current supply to the motor 13 is interrupted, the intervening interruptions serving to change the velocity ratio back to its normal value.

In Figure 2 an alternative method of control is indicated, however, and in this case the pawls 41 and 42 are actuated by means of an arm 43 serving as an armature of an electro-magnet 44. The latter is fed from a battery 45 through a switch 46, so that when said switch is closed the electro-magnet 44 is energized, thus attracting the arm 43 against a return spring 47 so withdrawing the detent 42 from the wheel 24 and engaging the detent 41 with the wheel 31. This mode of correction is very suitable for turret clocks, as the battery 45 and switch 46 can be remotely located relative to the clock itself.

An alternative method of changing the velocity ratio is shown in Figures 3 to 8, in which the direction of rotation of the synchronous motor is reversed when it is desired to lower the velocity ratio for resetting the clock. It is well known that small self-starting synchronous motors of the type having a permanent magnet rotor such, for example, as is described in Patent No. 1,976,880, will ordinarily commence and continue to rotate in a direction which is quite indeterminate. In this case a frame having plates 50, 51 and 52 accommodates the synchronous motor 13, which through its pinion 14 drives a dual gear train, the component wheels of which are as follows. During normal running the pinion 14 rotates in the direction of the arrow C, thus driving a gear wheel 53 which is formed in one with a pinion 54 driving a gear wheel 55. The latter is formed with a pinion 56, and this in turn drives a gear wheel 57 which serves to rotate a spindle 58 through the medium of a pawl 59, which is carried by said gear wheel 57 and which meshes with a ratchet wheel 60.

The second train which comes automatically into operation when the pinion 14 rotates in the opposite direction consists of the gear wheel 53, which drives direct to a gear wheel 61 carrying a pawl 62 in engagement with a ratchet wheel 63 fast upon the spindle 58. As both of the wheels 57 and 61 are in themselves free to rotate upon the spindle 58, it is obvious that the wheel 57 or 61 which is not driving the spindle 58 will rotate idly in a rearward direction. In the example shown the spindle 58 carries a pinion 64 which drives a gear wheel 65 carried upon the usual "seconds" spindle 66 of the clock movement. Further reduction gearing (not shown) is, of course, used in the normal way to produce the necessary movement of the hour and minute hands (not shown).

Figure 4:
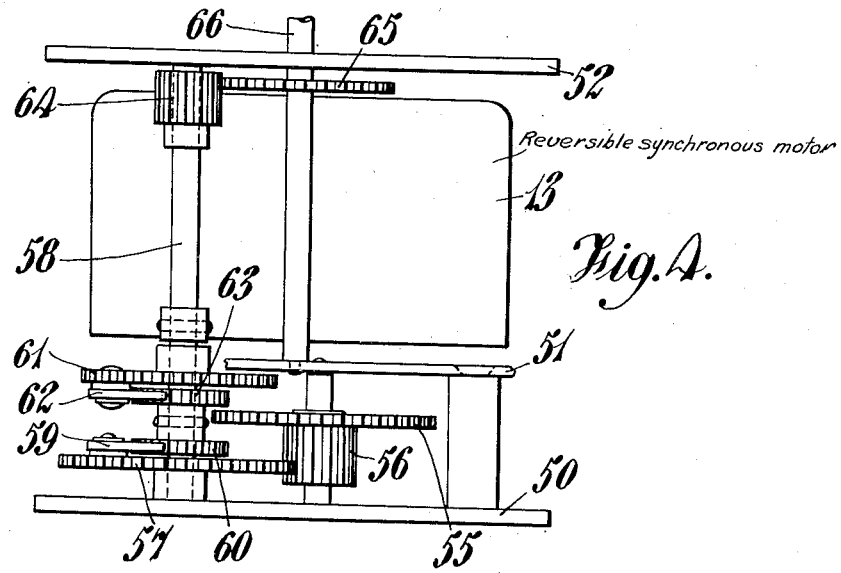
Figure 4 is a plan corresponding to Figure 3.
Figure 3:
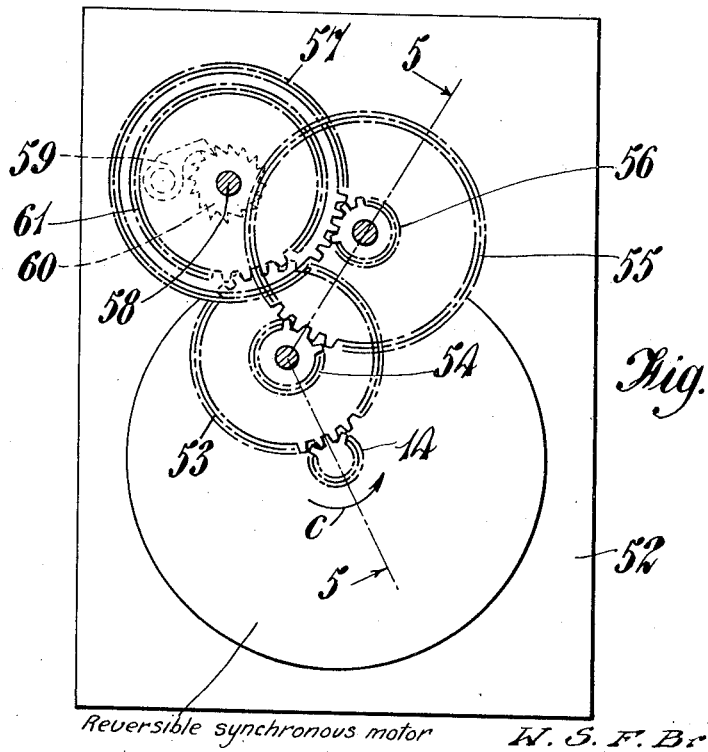
Figure 3 is a rear elevation, partly in section, of a modified form of synchronous motor clock in which the rotational direction of the motor determines the speed of advance, one of the frame plates being removed.

It will, of course, be obvious that the synchronous motors used in clocks according to the invention must be of the self-starting type, and in consequence means are normally required to determine positively the direction in which rotation is desired. One such device particularly applicable to the duel gear train embodied in Figures 3 and 4 is shown in Figures 5, 6 and 7 and comprises a disc 70 arranged to be positively driven by the motor 13, said disc in the present instance being fixed to a spindle 71 carrying the gear 53 and the pinion 54. The disc 70 is cut away for part of its circumference as indicated at 72 in Figures 6 and 7, for engagement with a pin 73 carried by a flywheel 74 which is rotatably mounted on the spindle 71. Thus, when the motor 13 is switched off, consequently arresting the motion of the disc 70, the flywheel 74 tends to continue running and comes to rest when the pin 73 reaches the end of the cut away portion 72. This movement is utilized for the purpose of predetermining the direction in which the motor 13 will next start, and for this purpose a pair of pawls 75 and 76 are pivoted upon the disc 70 at 77, said pawls being drawn towards one another by a coiled tension spring 78 and being fitted with controlling arms 79 and 80 which are bent to serve as cams actuated by the pin 73. The pawls 75 and 76 cooperate with an axially grooved projection 81 which is fixed to the plate 50 and acts in the manner of a stationary ratchet wheel. This mechanism has the effect of reversing the direction of the motor 13 each time the latter is started. It will be seen that in the position of the parts shown in Figure 6, the pawl 75 is cooperating with the projection 81, and therefore movement of the disc 70 in an anti-clockwise direction will immediately be arrested by the pawl 75 coming into contact with the radial part 82 of the projection 81. The disc 70, will, therefore, bounce in the opposite direction and start rotating in the desired manner, the pawl 75 being thrown outwards by centrifugal force and thus skimming over the periphery of the projection 81. When the motor 13 is next switched off the flywheel 74 overruns as previously explained until it assumes the position shown in Figure 7, in which it holds the pawl 75 out of contact with the projection 81 while the pawl 76 is brought into engagement. Thus, in the event of the motor next starting in a clockwise direction the pawl 76 will strike the radial part 83, and the bouncing effect will start the motor off in the desired anti-clockwise direction. In either case, the pawl 75 or pawl 76 is inoperative if the motor happens to commence rotating in the desired direction.

Where the dual gear train shown generally in Figures 3 and 4 is to be used in conjunction with an electric three-wire or other remote control, the arrangement illustrated in Figure 8 may conveniently be used for governing the direction in which the synchronous motor is allowed to start. In this modification a disc 84 is arranged in positive driving connection with the synchronous motor, and is fitted with one or more axially directed projections 85 adapted to cooperate with one or other of a pair of detents 86 and 87, either of which can be brought into the track of the projection 85 for the purpose of arresting motion of the disc 84 in the wrong direction without stopping its rotation in the desired direction. The detents are drawn together by a coiled spring 88 and bear against stops 89 and 90 respectively upon a carrier 91, said carrier being pivoted at 92 and being adapted normally to rest upon an adjustable abutment screw 93. This brings the detent 86 into the path of the projection 85 so that the disc 84 can rotate freely in an anti-clockwise direction but is immediately reversed should it happen to start off in a clockwise direction.

When the motor is to be reversed for resetting purposes an electro-magnet 94 is energized by closing a switch 95 connected with the mains 96, thus raising the carrier 91 against a stop 97 and bringing the detent 87 into operation for permitting the disc 84 to run in a clockwise direction. The synchronous motor is indicated at 98, and it will be seen that the installation requires the usual three wires between the clock and the point from which said clock is to be reset, said wires being indicated at 99, 100 and 101.

Although as illustrated in Figures 2 and 8 the improved synchronous motor clocks are suitable for resetting at a distance by means of an electrical control circuit having one or more wires in addition to those feeding current to the motors, the improved clocks are particularly adapted for automatic control employing only the usual pair of feed conductors, and whereby in the event of a current-failure a record is kept of the duration of said failure. When the current is restored the whole of the clocks in the system advance at the rapid resetting rate until the correct time indication is reached, the velocity ratio in the various clocks being then automatically returned to their usual ratio so that thereafter the clock system operates in the normal manner. This effects a comparatively great saving in the price of the system, as the existing electric light or power wiring of a building can be utilized without modification for the purpose of not only running the clocks of the system but also for effecting their resetting in the case of a temporary failure of the supply. The constructional details of a control clock suitable for this purpose are shown diagrammatically in Figures 9 to 12, while the general circuit arrangement of the clock system is illustrated in Figure 13. The general form of the control clock is seen best from the plan view Figure 9, and comprises a pair of clock plates 110 and 111 adapted to accommodate a two-speed clock movement, such for example as the one shown in Figure 1 or that in Figures 3 to 7, the gear train being arranged to drive a gear wheel 112 at the rate of one revolution per minute when the motor is operating with its normal velocity ratio, said gear wheel 112, therefore, being driven at the same rate as the usual seconds hand. The gear wheel 112 is formed upon a sleeve 113 which is freely rotatable upon a time storage spindle 114, and which is also secured to a crown wheel 115 forming one element of a differential gear. The second element comprises a pair of planet pinions 116 each rotatable upon a transverse arm 117 secured to the spindle 114, while the third element consists of two crown wheels 118 and 119 secured back to back upon a sleeve 120 which is freely rotatable on the spindle 114. As shown, the crown wheel 119 is constantly in mesh with an idler 121 which in turn meshes with a gear wheel 128 fast upon a pilot dial spindle 122, said wheel 128 having the same number of teeth as the crown wheel 119 so that it rotates at an equal speed. The pilot dial spindle 122 terminates at its front end in a seconds arbor 123, and is fitted also with a pinion 124 adapted to drive the minute hand 125 and the hour hand 126 of a pilot clock through reduction gearing of the usual form, indicated generally at 127.

Figure 12:
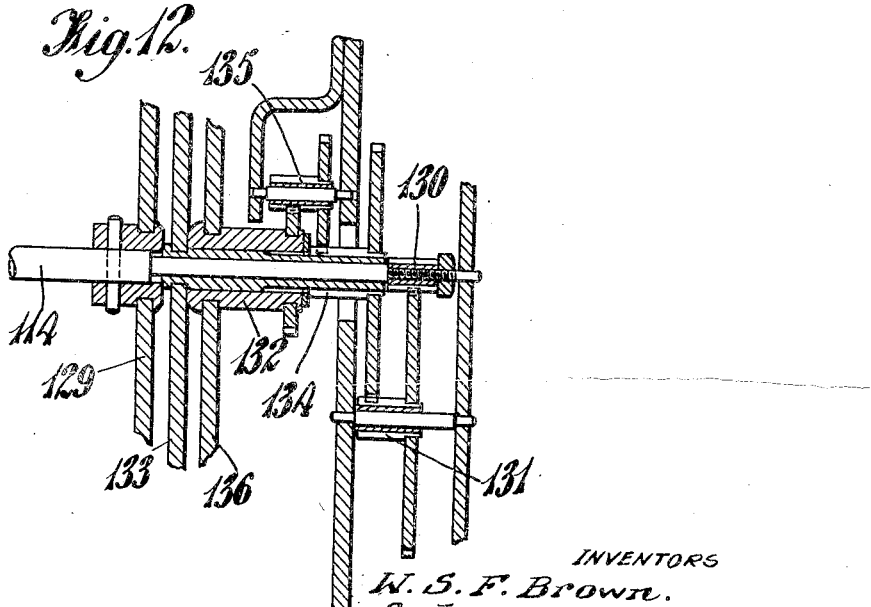
Figure 12 is a sectional plan to an enlarged scale showing the construction of the current-failure time-storage device incorporated in Figure 9.

The time storage spindle 114 carries a disc 129, said spindle as will be seen from Figure 12 being fitted with a pinion 130, which through a reduction gear 131 drives a sleeve 132 and a disc 133 at one sixtieth the speed of the disc 129. The sleeve 132 also carries a pinion 134 driving a reduction gear 135 having a ratio of 12:1 for driving a third disc 136.

Figure 11:
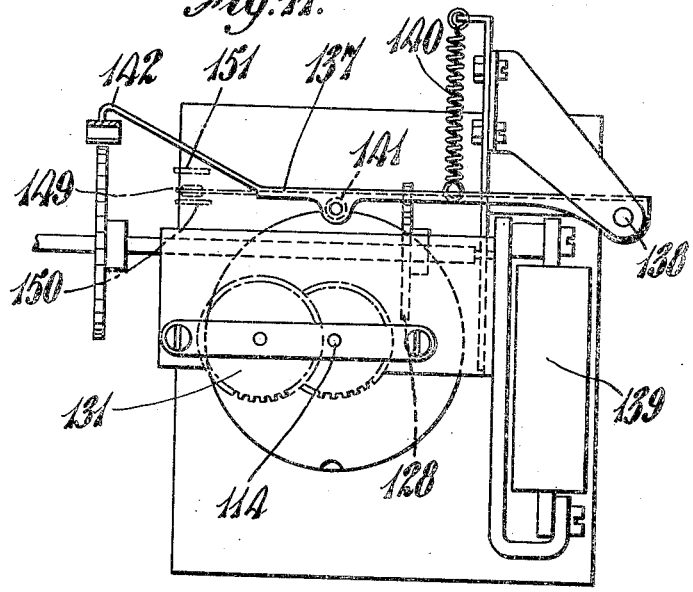
Figure 11 is a side elevation looking in the direction of the arrow B in Figure 9.

For cooperation with the discs 129, 133 and 136 an arm 137 is pivoted at 138, as will be seen in Figure 11, and is drawn downwards against the influence of a spring 140 by an electro-magnet 139 so long as mains current is being supplied. The arm 137 carries a transverse pin 141 which rests across the peripheries of the three discs 129, 133 and 136, and for cooperation with this pin a single semi-circular notch is formed in the disc 129, a similar notch is formed in the circumference of the disc 133, while two such notches arranged diametrically opposite are formed in the disc 136. The notches in the discs 129 and 133 and one of the notches in the disc 136 are disposed in register with the pin 141 when the clock system is operating normally, the downward pull exerted by the electro-magnet 139 being sufficient to cause the pin 141 to lock the discs against rotation. When the pin 141 is so engaged the arm 137 is in its lowermost position and its tip portion 142 (see Figures 10 and 11) is caused to bear upon the tail end 143 of a pawl 144, thus raising the nose 145 of said pawl away from the teeth of a ratchet wheel 146 carried by the pilot dial spindle 122. The pawl 144 is pivoted to a transverse arm 147 carried by a pendulum, part of which is indicated at 148. This pendulum is arranged to oscillate continually under any suitable motive power, such for example as a local battery or a spring movement which is indicated diagrammatically at 148a in Figure 9 and is preferably wound electrically in any known manner. When the system is functioning normally, i. e. when the mains current is being supplied and the clocks are all registering the correct time, the pendulum movement is not made use of as the pawl 145 is held away from the ratchet wheel 146. Further, the arm 137 is fitted with a spring contact leaf 149 which engages a lower contact 150 when the pin 141 is in engagement with the notches in the discs, and when it is not so in engagement the contact 149 then engages an upper leaf 151.

The operation of the mechanical parts of the control clock shown in Figures 9 to 12 is as follows. During normal running of the system with mains current being supplied and the clocks showing the correct time, the gear 112 is driven at the normal speed of one revolution per minute while the discs 129, 133 and 135 are in their locked condition, and therefore rotation of the crown wheel 115 is transmitted through the stationary planets 116 to the crown wheel 118 and thence to the pilot dial spindle 122, thus maintaining the hands 125 and 126 to show the correct time. In the event of a current-failure the gear wheel 112 becomes stationary, while the arm 137 is moved to its raised position by means of the spring 140. This brings the pawl 144 into cooperation with the ratchet wheel 146, thus maintaining the movement of the pilot dial spindle 122. This movement, however, is also transmitted by way of the gear wheel 128 to the crown wheel 119, rotation of which in turn causes movement to be imparted from the crown wheel 118 to the planets 116 and planet carrier 117. The latter thus rotates at the rate of one half a revolution per minute carrying with it the disc 129. The disc 133 consequently rotates in the same direction at the rate of half a revolution per hour, and the disc 136 at half a revolution in twelve hours. It will be seen that this movement brings the notches in the discs out of register with the pin 141, so that when the mains current is once more reinstated the arm 137 cannot return to its lowered position until permitted by the discs so that the pendulum 148 continues to drive the pilot dial spindle 122, despite the fact that the gear wheel 112 is then rotating at say sixteen times its normal speed in common with all the clocks of the secondary system and is rapidly returning the discs 129, 133 and 136 to their zero condition. When this condition is reached all the lost time has been made up and the pin 141 drops into the notches in the discs, thus putting the pawl 144 out of action. The fact that the discs are once again locked enables the gear wheel 112 to revert to its normal speed, as will now be explained, and to drive the pilot dial spindle 122 in the usual manner.

The electrical part of the improved system employs what is hereinbefore defined as an alternate break relay, this being indicated at D in Figure 13, and comprising an electro-magnet 160 having an armature 170 pivoted at 171 and arranged to carry a loosely pivoted thrust member 172 adapted to cooperate with one or other of a pair of V notches 173, 174 in a pivoted member 175 carrying a contact arm 176. The member 175 has a dead centre spring 177 whereby the contact on the arm 176 is held in engagement, either with an upper contact 178 or with a lower contact 179. The armature 170 is drawn downwards by a spring 180, and it will be seen that the relay operates only when the circuit through the electro-magnet is broken, the armature 170 being pulled down so that, if the relay is initially in the position shown in Figure 13, the thrust member 172 will then engage the notch 174, thus moving the member 175 in a clockwise direction. The next time the current through the electro-magnet 160 is broken the notch 173 will be immediately below the elevated thrust member 172, and in consequence the member 175 will be returned to the position shown in Figure 13. The electrical equipment also includes a "pull off" contactor 181, the coil 182 of which when energized serves to break a pair of contacts 183 connected in the phase lead 184 of the electricity supply between the mains input 185 and the distribution lead 186. The neutral wire is indicated at 187.

The electrical operation of the improved automatic controlling system is briefly as follows. Normally, the position of the various parts are as shown in Figure 13, current being supplied from the mains through the phase lead 185 and the neutral lead 187 to the electro-magnet 139 of the control clock, the electro-magnet 160 of the alternate break relay D, the two-speed clock movement of the control clock indicated at 188, and any number of secondary clocks 189 according to the invention having synchronous motors and also means whereby the velocity ratio between said motors and the hands or equivalent is changed each time the supply current ceases. Should the current supply be switched off from the phase input 185 this will automatically cause the clock movements 188 and 189 to revert to their high or resetting speed position, while the electro-magnets 160 and 139 will be released, thus changing over both of the contacts 176 and 149. During the period that the supply is off the notches in the discs 129, 133 and 136 will have moved out of register with the pin 141, so that upon resumption of the current supply the arm 137 will be unable to resume its lower position, despite the fact that the electro-magnet 139 is energised. The clock movements 188 and 189 will, moreover, proceed to move the hands or equivalent indicating means at the increased rate of say sixteen times the normal speed until such time as the notches in the discs 129, 133 and 136 once again register with the pin 141. This allows the arm 137 to drop, thus completing the circuit through the coil 182 of the cut out, from the arm 176 to the contact 179 and thence through the contacts 150 and 149 to the neutral lead 187. This energisation of the magnet 182 pulls apart the contacts 183, thus instantaneously switching off the current feeding the electro-magnet 160, the clock movement 188 and the various secondary clock movements 189. These clock movements are thus caused to revert to their normal gear ratios, while the fact that the electro-magnet 160 is deenergised causes the arm 176 of the alternate break relay to resume its raised position thus cutting off the electro-magnet 182 and enabling the system to resume its normal operation.

It is, of course, possible that a second current failure might occur while the clock movements 188 and 189 are catching up the time lost from the first current failure, and in this event the gear ratios of the various clocks will not only be prematurely returned to their normal values but also the alternate break relay D will be actuated, thus raising the arm 176. As the arm 137 is already raised owing to the fact that the discs 129, 133 and 136 are out of their zero position, the circuit through the coil 182 will immediately be completed, thus producing a further interruption in the supply immediately after the supply is again resumed for restoring the clock movements 188 and 189 to their high speed condition. This interruption also correspondingly resets the alternate break relay D, so that the arm 176 is in its lowered position in readiness for producing the final current interruption when the discs 129, 133 and 136 reach their zero position.

It will be realised that this installation is described by way of example only, and that other methods may be employed for communicating between the master unit and the clocks or equivalent being controlled by means of changes in the supply current. In the case illustrated these changes consist in utilising the current failure on the one hand and producing additional current failures of comparatively short duration for restoring the clock units.

What we claim is:

1. A synchronous-motor clock comprising in combination, a single synchronous and reversible motor, an indicator, a normal driving connection from the motor to the indicator operative when the motor runs in one sense, and a fast resetting driving connection from the motor to the indicator operative when the motor runs in the opposite sense.

2. A synchronous-motor clock comprising in combination, a single synchronous and reversible motor, an indicator, a normal driving connection from the motor to the indicator operative when the motor runs in one sense, a fast resetting driving connection from the motor to the indicator operative when the motor runs in the opposite sense, and means for reversing the direction of rotation of the motor at each energization.

3. A synchronous-motor clock comprising in combination, a single synchronous and reversible motor, an indicator including a shaft to be driven from the motor always in the forward sense appropriate to the indicator, a normal driving connection from the motor to the driven shaft operative when the motor runs in one sense, and a fast resetting driving connection from the motor to the shaft operative when the motor runs in the opposite sense, each driving connection including a ratchet on the shaft, and a driving pawl adapted to engage said ratchet.

4. A synchronous-motor clock comprising in combination, a synchronous reversible motor, an indicator, a normal driving connection from the motor to the indicator operative when the motor runs in one sense, a fast resetting driving connection from the motor to the indicator operative when the motor runs in the opposite sense, and means in the motor drive and which upon deceleration of the motor when the electric supply is interrupted, blocks rotation of the motor in one direction so that upon restoration of the supply said motor will run in the alternative sense from that in which it was last running.

5. A synchronous-motor clock comprising in combination, a synchronous reversible motor having a rotor, an indicator, a normal driving connection from the motor to the indicator operative when the motor runs in one sense, a fast resetting driving connection from the motor to the indicator operative when the motor runs in the opposite sense, a flywheel for the motor which is permitted free movement relative to the rotor thereof so that said flywheel overruns the rotor upon deceleration of the latter, and means in the motor drive and actuated by the over-running flywheel to lock the motor in one direction so that said motor will run in the alternative sense when again energized.

6. A synchronous-motor clock control comprising in combination, a single synchronous motor, a time storage means, a driving connection of clock resetting ratio between the motor and the time storage means, an electric supply feeding the synchronous motor, means establishing said connection upon occurrence of a first interruption of the electric supply and breaking it at occurrence of a second interruption of said electric supply, means setting the time storage means into operation upon occurrence of said first interruption, and means actuated by the time storage means momentarily to interrupt the supply for a second time when the time storage means has been restored to zero by the motor.

7. A synchronous-motor clock control for use with a synchronous motor clock system and comprising in combination, a single synchronous motor, a time storage means, a driving connection of clock resetting ratio between the motor and the time storage means, an electric supply feeding the synchronous motor, means establishing said connection upon occurrence of a first interruption of the electric supply and breaking it at occurrence of a second interruption of said electric supply, a normally closed switch in the electric supply line to the clock system, and a supplementary circuit including electromagnetic means which when energized opens said normally closed switch, said supplementary circuit also including a pair of associated two-way switches, one switch being actuated by electromagnetic means in the motor circuit and the other switch being actuated by the time storage means, said supplementary circuit being closed only upon each alternative interruption of said electric supply.

8. A synchronous-motor clock control for use with a synchronous motor clock system and comprising in combintion, a synchronous motor, time storage means, a driving connection of clock resetting ratio between the motor and the time storage means, an electric supply feeding the synchronous motor, means establishing said connection upon occurrence of a first interruption of the electric supply and breaking it upon occurrence of a second interruption, a normally closed switch in the electric supply line to the clock system, a supplementary circuit including electromagnetic means which when energized opens the normally closed switch, said supplementary circuit also including a pair of parallel branches having at each end a two-way switch, and electromagnetic means associated with the motor to be de-energized simultaneously therewith and upon a first de-energization to change one of said two-way switches from the first branch to the second branch and upon occurrence of a second de-energization to change said switch back again to the first branch, said second two-way switch being connected to the second branch when the time storage means is in zero position and to the first branch when it is in a position other than zero.

9. In a clock having a single synchronous and reversible motor, a device operative to cause the motor to reverse direction at each running, comprising in combination, a pair of opposing detents, a common ratchet wheel, and means responsive at deceleration of the motor to switch each detent alternately into operative position.

WESTGARTH STANHOPE FORSTER BROWN.
ALFRED JOHN TENNISON.